United States Patent [19]

Sølbeck

[11] Patent Number: 5,387,250
[45] Date of Patent: Feb. 7, 1995

[54] FASTENING MEMBER FOR FASTENING A COVER AND TOOL THEREFOR

[75] Inventor: Peter Sølbeck, Rungsted Kyst, Denmark

[73] Assignee: Polysheet A/S, Herlev, Denmark

[21] Appl. No.: 920,600

[22] PCT Filed: Mar. 25, 1991

[86] PCT No.: PCT/DK91/00092
 § 371 Date: Sep. 4, 1992
 § 102(e) Date: Sep. 4, 1992

[87] PCT Pub. No.: WO91/14842
 PCT Pub. Date: Oct. 3, 1991

[30] Foreign Application Priority Data

Mar. 27, 1990 [DK] Denmark .................. 780/90
Sep. 20, 1990 [EP] European Pat. Off. .......... 90610062

[51] Int. Cl.[6] ............... B65D 63/00; B26F 1/00
[52] U.S. Cl. ................. 24/16 PB; 24/17 AP; 30/358; 248/74.3
[58] Field of Search ........... 24/16 PB, 17 AP, 16 R, 24/30.5 P; 248/74.3; 30/358; 164/33; 227/67

[56] References Cited

U.S. PATENT DOCUMENTS

| | | | |
|---|---|---|---|
| 843,344 | 2/1907 | Linderman | 30/358 |
| 1,589,127 | 6/1926 | Deveault | 30/358 |
| 2,087,186 | 7/1937 | Freeman, Jr. | 30/358 |
| 3,149,808 | 9/1964 | Weckesser | 248/74.3 |
| 3,438,095 | 8/1967 | Evans . | |
| 3,470,834 | 10/1969 | Bone | 227/67 |
| 4,090,653 | 5/1978 | Furutu . | |
| 4,402,446 | 9/1983 | Suzuki . | |
| 4,490,886 | 1/1985 | Omata . | |
| 4,501,049 | 2/1985 | Adamson | 24/16 PB |
| 4,580,319 | 4/1986 | Paradis | 24/16 PB |
| 4,638,966 | 1/1987 | Ford | 248/74.3 |
| 4,766,651 | 8/1988 | Kobayashi et al. | 24/16 PB |
| 4,978,091 | 12/1990 | Anderson et al. | 248/74.3 |
| 5,027,477 | 7/1991 | Seron | 24/3 B |

FOREIGN PATENT DOCUMENTS

| | | |
|---|---|---|
| 0310850 | 4/1989 | European Pat. Off. . |
| 2326958 | 12/1974 | Germany . |
| 3204654 | 8/1983 | Germany . |
| 0933929 | 8/1963 | United Kingdom ......... 248/74.3 |
| WO88/04368 | 6/1988 | WIPO . |

*Primary Examiner*—Victor N. Sakran
*Attorney, Agent, or Firm*—Beveridge, DeGrandi, Weilacher & Young

[57] ABSTRACT

For the fastening of a protecting or shielding cover, in particular a tarpaulin, to a scaffolding, a fastening member is provided which has an anchor pin to be arranged on the external surface of the tarpaulin, a flexible strap being firmly connected with the anchor pin and having a slit or opening through which the free end of the strap may be pushed and a toothing to prevent the strap from being retracted. The slit or opening is provided in a clamping member at the opposite end of the strap in relation to the insertion end and the anchor pin is connected with the strap at a distance from the clamping member conforming to the dimensions of a frame member of the scaffolding, while the distance of the anchor pin from the insertion end is substantially larger. For mounting the fastening member use is made of a tool in which a hollow piston axially displaceable in a holder has a pointed cutting end and is designed to receive the anchor pin of the pin being pressed out of the hollow piston by use of a slide accommodated in the piston.

22 Claims, 4 Drawing Sheets

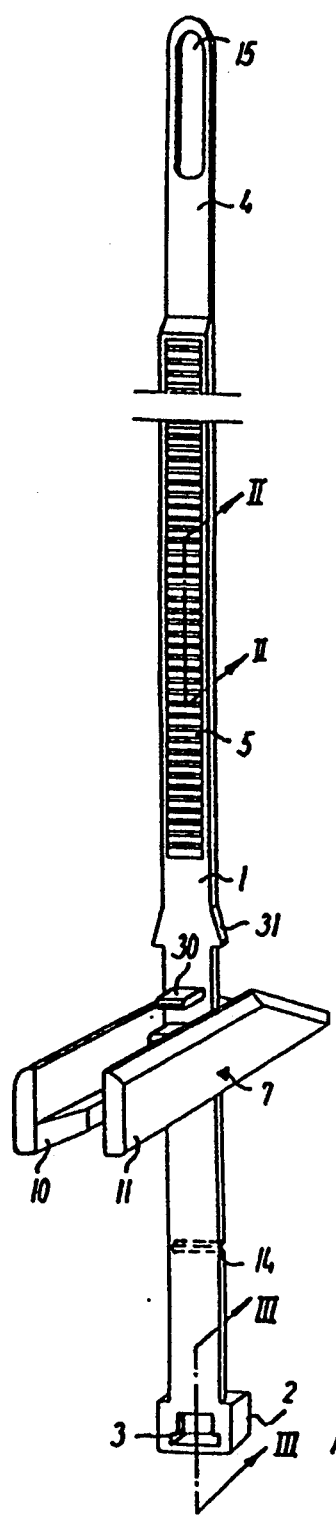
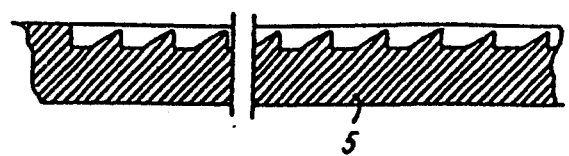
FIG. 2
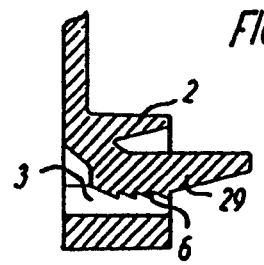
FIG. 3
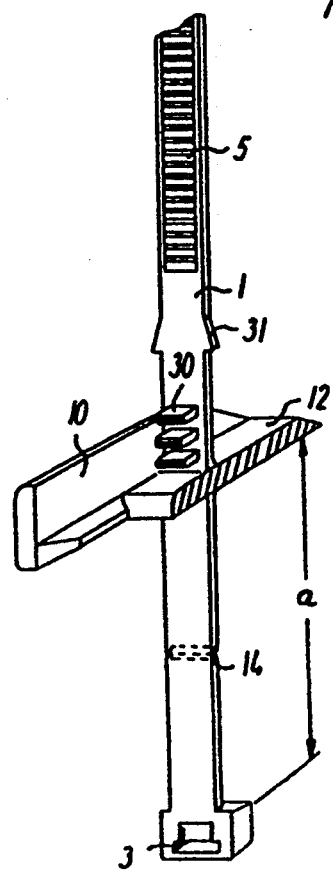
FIG. 1
FIG. 4

: 1

FASTENING MEMBER FOR FASTENING A COVER AND TOOL THEREFOR

FIELD OF THE INVENTION

The invention relates to a fastening member for fastening a protecting or shielding cover, in particular a tarpaulin, to a scaffolding or a similar supporting structure, and of the type comprising an anchor pin to be inserted through the cover from the surface of the cover facing the scaffolding, and a flexible strap of elastic material connected with the anchor pin and having a slit or opening in which the free end of the strap may be inserted, said strap having on part of its length a toothing or a similar contouring preventing the strap from being retracted after insertion through said slit or opening.

BACKGROUND DISCUSSION

Flexible straps for fastening a tarpaulin to a scaffolding, e.g. in connection with building work in winter, are known e.g. from DK-B-156 307.

In a strap of the above design disclosed in International Patent Application No. PCT/DK87/00155 (WO88/04368) the anchor pin is provided in that a piercing member at one end of the strap is designed as a harpoon-like squeezer to engage the external side of the tarpaulin, and the insertion slit or opening for the opposite free strap end is positioned immediately behind the piercing member so as to be positioned, after perforation of the tarpaulin by the harpoon-like squeezer engaging the external surface thereof, immediately inside the internal surface of the tarpaulin between the tarpaulin and the generally tubular frame structure to which the tarpaulin is to be fastened by the actual strap.

This impedes the mounting, since the free strap end has to be inserted in the slit or opening from the side of the frame structure facing the tarpaulin.

From DE-11-3204654 another design of a fastening member is known in which the anchor pin is connected by means of an elastic hinge joint with an intermediate member of U-shaped cross-section interconnecting two strap ends one of which is provided with elongate holes to engage with locking members projecting from the other strap end.

When mounting this fastening member the anchor pin must be manually turned from its normal position transverse to the strap on order to be passed through an eyelet in a tarpaulin and for establishment of the locking engagement between the elongate holes on one strap end and the locking members on the other both strap ends must be manipulated which makes the mounting a rather cumbersome operation when taken into account that normally a large number of fastening members are used for fastening a tarpaulin to a scaffolding.

The same disadvantage occurs with a still further design disclosed in DE-A-2326958 in which one free strap end forms a harpoonlike member with a number of local enlargements for engagement with key-hole shaped openings in the other strap end.

SUMMARY OF THE INVENTION

The present invention provides for considerably improving the ease of mounting, and is characterized in that said slit or opening is provided in a clamping member at the opposite end of the strap in relation to the insertion end, and in that the anchor pin is arranged substantially transverse thereof at a distance from said clamping member conforming to the dimensions of a member of the scaffolding or supporting structure while the distance of the anchor pin from the insertion end is substantially larger than said distance from the clamping member, the anchor pin being designed with two uniform parts positioned on either side of the strap, and connected with an intermediate member having opposite external and internal lateral surfaces which are firmly connected with the parts of the strap accommodating the clamping member and the free end of the strap, respectively, the intermediate member being further provided with an opening for retracting the free strap end to allow both parts of the strap to extend from the internal side of the intermediate member.

By the above design the clamping member with the insertion slit or opening will be positioned, after the tarpaulin has been pierced by means of the anchor pin engaging the external surface of the tarpaulin, at such a distance from the perforation that the free strap end, due to the flexibility and natural rigidity of the strap, may be put around the scaffolding member and through the slit, thereby pulling the clamping member on to the side of the scaffolding frame member facing away from the tarpaulin.

Moreover the particular construction of the anchor pin with two uniform side parts interconnected by an intermediate member to provide a general U-shaped cross section of the anchor pin with the two strap ends projecting from either of the opposite external and internal sides of the intermediate member provides at the same time for a sturdy design of the fastening member with the free strap ends in firm connection with the anchor pin and low production costs since the complete fastening member may be produced in one piece from a suitable plastics material such as nylon without impeding the easy mounting due to the retractability of the free strap end through the opening in the intermediate member of the anchor pin.

Thus when mounting the fastening member the free strap end is retracted to extend from the same side of the anchor pin which may then easily be introduced through an eyelet in a tarpaulin with both strap ends accessible from the internal side of the tarpaulin facing the scaffolding. This particular design moreover allows introduction either normally or by a special tool whereby the mounting can be further facilitated.

The positioning of the clamping member on the side of the scaffolding frame member facing away from the tarpaulin makes it easier to dismount the strap, if desired. In this respect a further relief is obtained in that the insertion slit or opening of the clamping member is limited at one side by an elastically resilient, toothed member for engagement with the toothing of the strap. The toothed member may advantageously include an extension formed as a finger grip projecting outside the clamping member. The clamping member may thus be easily released from engagement with the toothing of the strap which may then be retracted without difficulty from the clamping member for reuse.

With the view of facilitating the insertion of the free strap end into the slit it is advantageous if the insertion end of the strap over a length is free of said toothing and has a smaller thickness than the remainder of the strap.

In a preferred embodiment of the fastening member according to the invention a substantial decrease of the productional costs is obtained as mentioned above by producing the strap, the anchor pin and the clamping member in one piece from a plastic material, preferably nylon. The strap may then be produced in a ready-for-use design in a single operation, preferably by injection moulding.

Thereby, the flexible strap may also be provided with a local cross-section reduction in the proximity of the anchor pin to abate the tensile strength. A controlled breakaway of the tarpaulin can then obtained in case of strong wind loadings, thereby preventing the scaffolding from being damaged.

The invention further relates to a tool for mounting the fastening member, characterized in that a hollow piston axially displaceable in a holder has a pointed cutting end to perforate a tarpaulin and to receive the anchor pin of the strap a condition in which the strap ends extend to the same side of the anchor pin in abutment against a slide accommodated within the hollow piston and which is not axially displaceable in relation to the holder, the hollow piston having in the proximity of its cutting end an external collar to engage the internal surface of the tarpaulin and being connected with the holder through a spring-biased release member which by actuation against the bias force releases the holder and the slide for axial displacement along the hollow piston to press out the anchor pin received in the hollow piston.

BRIEF DESCRIPTION

The invention will be explained in detail in the following with reference to the drawings, in which FIG. 1 illustrates an embodiment of a tarpaulin strap according to the invention, FIG. 2 shows a design of the toothing of the strap, viewed in profile, FIG. 3 is a sectional view of an embodiment of the clamping member of the strap, FIG. 4 shows a detail of the illustration in FIG. 1 of the anchor pin of the strap, FIG. 5 illustrates the use of the strap for fastening a tarpaulin made from a network reinforced plastics foil to a scaffolding member, FIGS. 6 to 8 show a perspective view, a longitudinal section and a cross-section of an embodiment of a tool for use in the mounting of the strap, FIGS. 9 and 10 illustrate a second embodiment of the anchor pin, and FIG. 11 a second embodiment of the clamping member.

DETAILED DESCRIPTION

Figure 5:
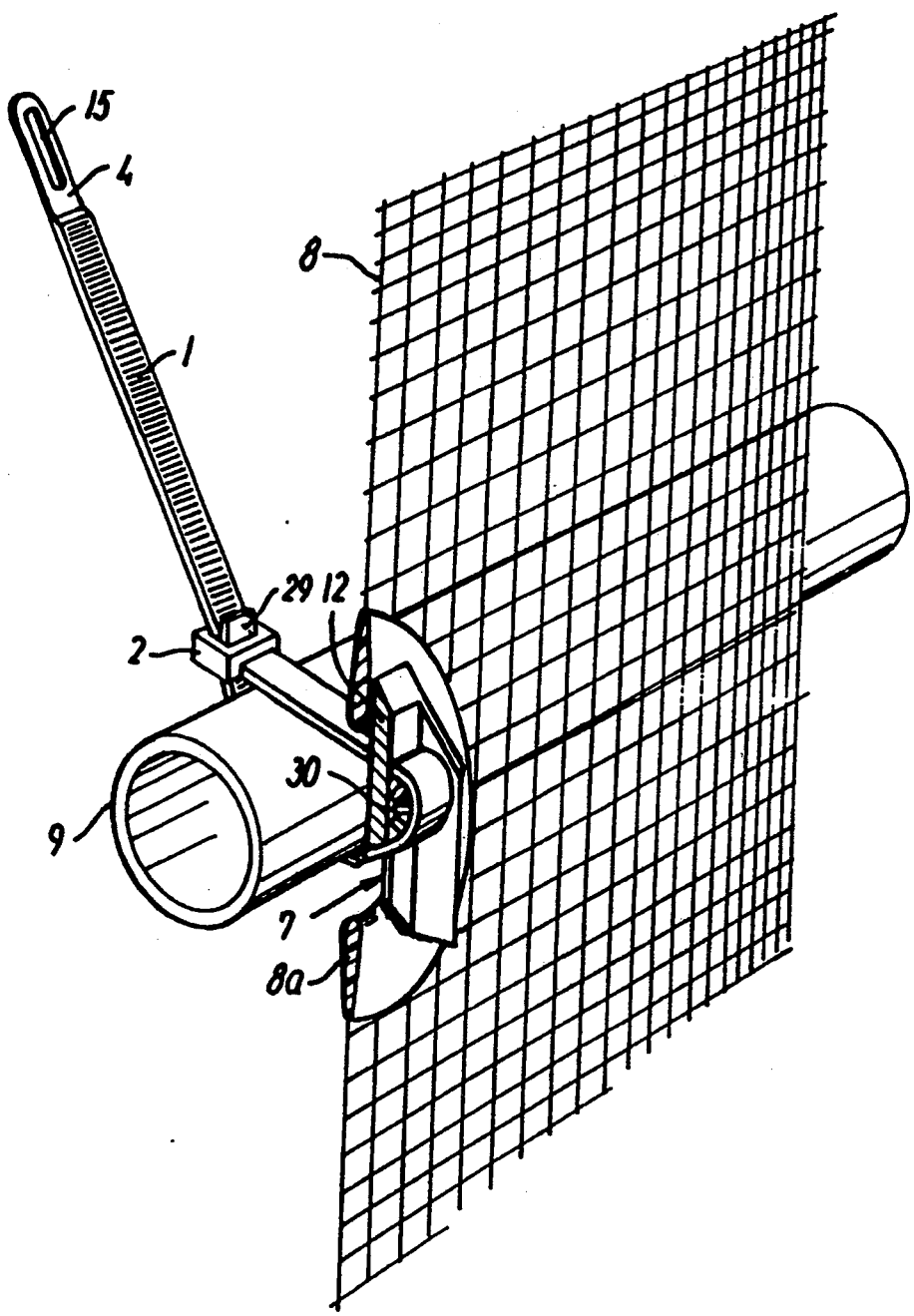

The strap 1 in FIG. 1 is shaped as an elongated tape or strip-formed element of an elastic plastic material, e.g. nylon.

The strap includes at one end a clamping member 2 with a slit or opening 3 through which the opposite free end 4 of the strap may be inserted.

On part of its length the strap 1 has a toothing 5 for engagement with a holding member, said toothing being e.g. shaped as shown in profile in FIG. 2.

In order to make it possible to retract the length of the strap 1 inserted in opening 3 the holding member of clamping member 2 may, as shown in FIG. 3, be designed as a flexibly resilient, toothed member 6 provided with an extension 29 formed as a finger grip and projecting outside the clamping member 2, then causing upon operation the cross-sectional area of the opening 3 to be widened to allow easy retraction of strap 1.

At a distance a from the clamping member 2 conforming to the transverse dimension of conventional scaffolding tubes a transverse pin 7 is connected with strap 1, said pin serving as anchor pin for the strap by abutment on the external surface of a tarpaulin 8, as illustrated in FIG. 5. The transverse pin 7 is firmly connected with the strap and may in a known manner be pointed at one end, thereby allowing it to pierce without aids a tarpaulin made from a network reinforced plastics foil.

As shown in FIG. 4, in the illustrated embodiment the transverse pin 7 is designed with two uniform, comparatively thin-walled side members 10, 11 positioned on either side of strap 1 and being connected on part of their length by an intermediate member 12 the underside of which is connected with the part of the strap comprising the clamping member 2, while the upper side of the intermediate member 12 is connected with the part of the strap including its free end 4.

In order to keep the part of the strap connected with the upper side of intermediate member 12 in place prior to arranging the transverse pin 7 in a tarpaulin 8, said part of the strap may at a short distance from transverse pin 7 be provided with laterally projecting protrusions 31, as illustrated in FIGS. 1 and 4, to engage the lateral edges of side members 10, 11 of transverse pin 7 facing clamping member 2.

As abutment for the transverse pin 7 serving as anchor pin, tarpaulin 8 is in a known manner provided with a substantial number of eyelets 8a, as shown in FIG. 5.

The positioning of the transverse pin at said distance from clamping member 2 located at one strap end entails, as shown in FIG. 5, that clamping member 2, after transverse pin 7 has penetrated the tarpaulin and this pin with the underside of the intermediate member 12 has engaged the external surface of the tarpaulin, is positioned at such a distance from the perforation that the free end of strap 4 may be carried around the scaffolding tube 9 through the insertion slit 3 of clamping member 2, also due to the flexibility and natural rigidity of the strap. Upon tightening strap 1 the clamping member 2 will be pulled on to the side of the scaffolding tube 9 facing away from tarpaulin 8, as shown.

In order to further facilitate the operation the insertion end of strap 1 has no toothing over some length and is formed with a reduced thickness.

The illustrated positioning of clamping member 2 makes it easy to dismount strap 1 in the above described manner.

In order to prevent excessive stress and the risk thereby involved of breaking the strap 1 upon bending the insertion end around the end of the intermediate member 12 which is oppositely located in relation to the pointed end of transverse pin 7, as illustrated in FIG. 5, strap 1 may have one or more projecting pins 30 immediately above transverse pin 7 engaging by said bending the intermediate member 12.

The strap 1 with toothing 5, transverse pin 7 and clamping member 2 with the elastically deformable toothed member 6 is preferably produced in one piece by injection moulding from a plastics material, preferably nylon.

The strap according to the invention may thus be produced in a ready-for-use design in a single operation, preferably by injection moulding.

In this connection there may be provided a local cross-section reduction in the strap 1 in the proximity of the transverse pin 7 and preferably in the part of the strap accommodating the clamping member 2, as shown by 14 in dotted lines in FIG. 1, in order to abate the ultimate tensile strength of strap 1. This particularly provides for obtaining an advantage when arranging a tarpaulin on a scaffolding that is not quite securely fastened in the building structure, since it is ensured in case of heavy loading by wind pressure that the strap 1 breaks to release the tarpaulin without causing damage to the scaffolding.

By the reduction of the cross-section by the arrangement of a core member in connection with the injection moulding there may be obtained a comparatively accurate control of the tensile strength at different core dimensions.

To further facilitate the use of the fastening member there may be provided at the free end of strap 1 an opening 15 for a common carrier for a considerable number of straps.

Even though transverse pin 7, as illustrated in FIGS. 1 and 4, may have a pointed end to allow it to be pressed through the eyelet 8a in tarpaulin 8 without the use of aids, this operation is, however, somewhat troublesome and time-consuming because larger areas to be covered require a rather considerable number of straps.

Figure 6:
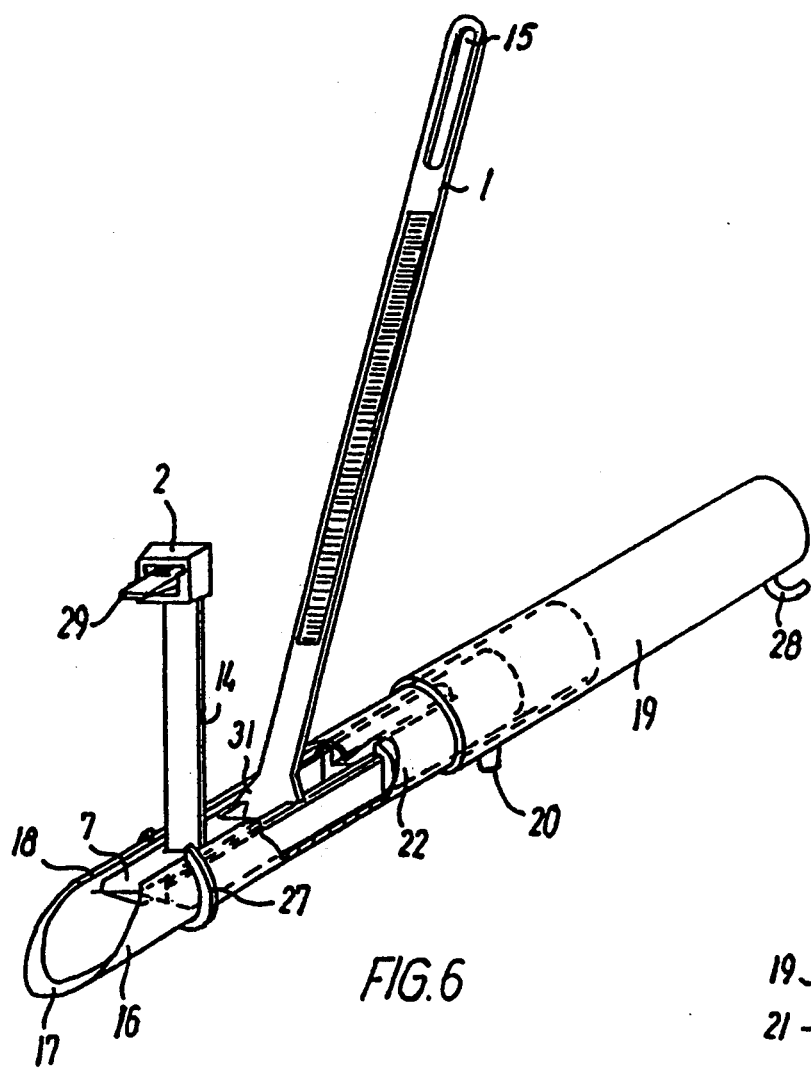
Figure 8:
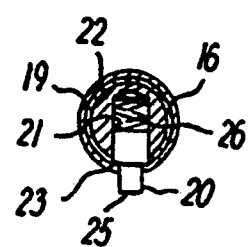
Figure 7:
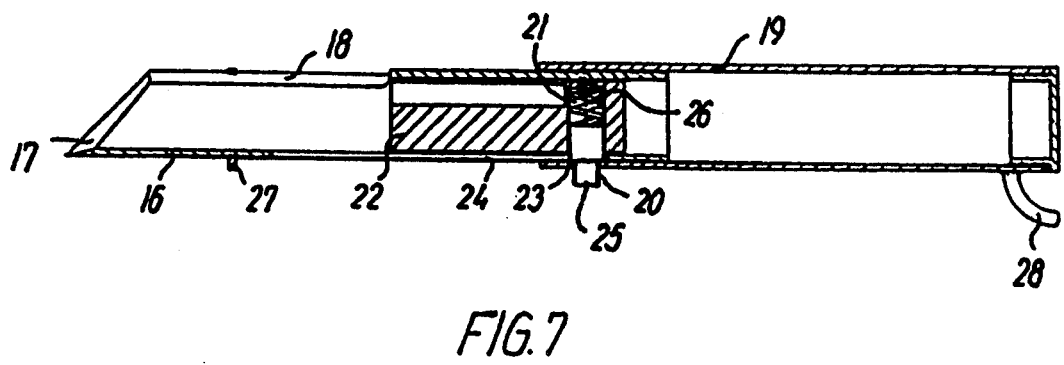

To facilitate the mounting a tool as shown in FIGS. 6 to 8 may be used instead.

The illustrated tool comprises a hollow piston 16 whose front edge is bevelled and sharpened to obtain a cutting edge 17 easily piercing a network reinforced foil of polyethylene. The hollow piston 16 is intended to receive transverse pin 7 of a strap 1 and is provided with a longitudinal slot 18 open toward the front edge and through which the two strap parts project which are positioned on either side of transverse pin 7.

The hollow piston 16 is longitudinally displaceable in a holder 19 by means of a spring-biased pin 20 extending into a bore 21 in a slide 22 accommodated within the hollow piston 16 and which by means of pin 20 is axially secured in relation to the holder 19.

Pin 20 has a part 23 disposed in bore 21 and with a larger diameter than the width of a longitudinal slot 24 provided in hollow piston 16 opposite slit 18, the part of said slot 24 that in the initial position is located opposite the pin 20 having a circular widening corresponding to said part 23. Pin 20 is externally provided with an operating pin 25 with smaller diameter than the width of slot 24.

By pressing pin 25 against the bias from spring 26 pin 25 is pushed into slot 24 so that holder 19 and slide 22 may be displaced axially across or into hollow piston 16 to cause the transverse pin 7 and thus the associated strap 1 to be pressed out.

In the proximity of the cutting front edge 17 the hollow piston 16 is externally provided with a collar 27 which in use is caused to engage the internal surface of the tarpaulin after the cutting front edge has pierced the tarpaulin, following which the transverse pin 7 is pressed out of the hollow piston 16 to engage the external surface of the tarpaulin.

The tool is subsequently retracted from the tarpaulin by means of holder 19. Due to the friction between the plastics foil and the hollow piston 16, the latter will by the retraction movement be pulled axially outwardly in the holder, until it reaches its home position shown in FIG. 7, in which it is arrested in relation to the holder by means of the spring-biased pin 20.

A very rapid piercing of the foil and arrangement of the fastening member is obtained by said tool, the two strap parts being thereby positioned on the internal surface of the tarpaulin after retraction of the tool.

To further facilitate the work, holder 19 may, as shown, be provided with an external hook 28 used to tighten up strap 1 after its free end 4 has been pushed through clamping member 2, hook 28 catching through opening 15 at the free end 4 of the strap.

Figure 9:
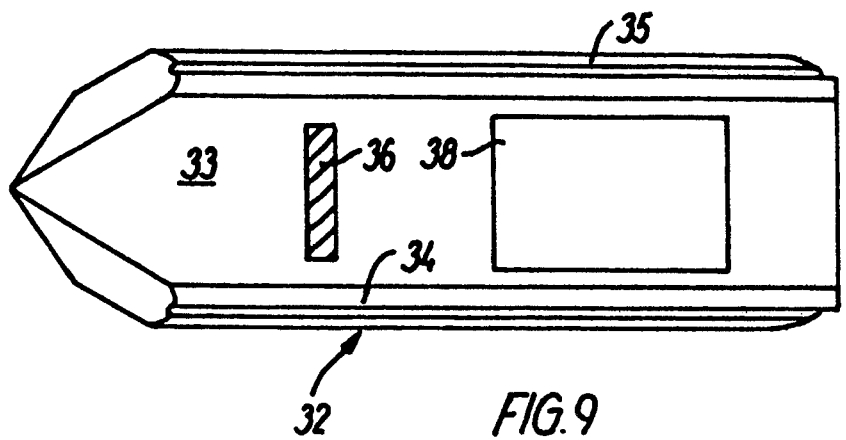
Figure 10:
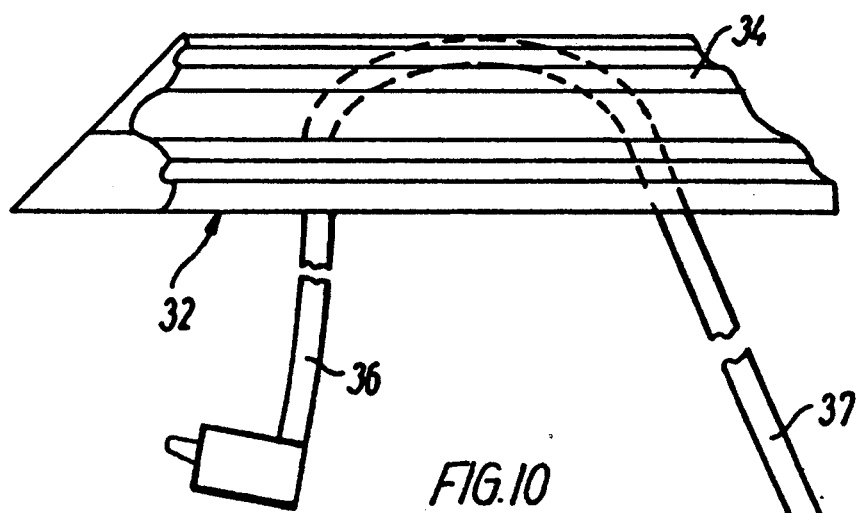

FIGS. 9 and 10 illustrate another embodiment of the anchor pin in a plane view perpendicular to the plane of the intermediate member 33 and in a side elevation, respectively, towards one end of side members 34 and 35.

The intermediate member 33 of transverse pin 32 to which the two ends 36, 37 of the strap are connected in the same manner as described above, extends throughout the length of the side members 34 and 35, thereby diminishing the risk of damage to the side members 34 and 35 upon the insertion of the transverse pin by a tool as illustrated in FIGS. 6 to 8, and is provided with an opening 38 through which the strap end 37 is inserted while bent so that the two ends 36 and 37 of the strap project to the same side of the intermediate member 33 to be placed in a mounting tool in the manner illustrated in FIG. 6.

Figure 11:
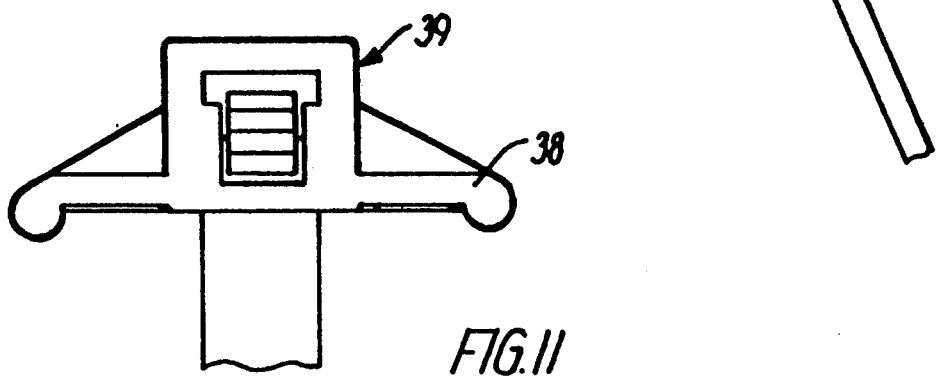

Reference numeral 39 in FIG. 11 illustrates an alternative embodiment of the clamping member with a transverse enlargement 40 forming a stop member for abutment on the surface of the tarpaulin facing the scaffolding after the transverse pin has been inserted therethrough, thereby preventing the comparatively short strap end with the clamping member from being entrained through the tarpaulin.

I claim:

1. A fastening member for fastening a protecting or shielding cover to a supporting structure, comprising:
an anchor pin (7) adapted for insertion through the cover from the surface of the cover (8) facing the supporting structure, and a flexible, flat strap (1) of elastic material which has two major surfaces and is connected with the anchor pin (7), and said strap having a clamping member at a first end with a slit or opening (3) formed therein in which a second or free insertion end (4) of the strap may be inserted, said strap having on at least part of its length a contoured surface for preventing the strap from being retracted after insertion through said slit or opening, said anchor pin (7) being arranged to extend substantially transverse with respect to said strap at a distance (a) from said clamping member (2) conforming to a dimension of a member of the supporting structure, the anchor pin (7) being designed with two uniform parts positioned on opposite sides of the strap, and said uniform parts being connected with an intermediate member having opposite external and internal lateral surfaces extending essentially at right angles to said major surfaces of said strap and said opposite external and internal lateral surfaces are firmly connected with a first part of the strap which includes the clamping member and a second part of the strap which includes the free end of the strap, respectively, and the intermediate member further defining an opening suitable for retracting the free strap end to allow both parts of the strap to extend from the external lateral surface of the intermediate member.

2. A fastening member as claimed in claim 1, characterized in that the insertion slit or opening (3) of the clamping member (2) is defined on one side by an elastically resilient, toothed member (6) for engagement with the contoured surface of the strap.

3. A fastening member as claimed in claim 2, characterized in that the supporting structure is a scaffolding.

4. A fastening member as claimed in claim 2, characterized in that the contoured surface (5) is a surface with toothing and the insertion end (4) of the strap over a length is free of said toothing (5) and has a smaller thickness than the remainder of the strap (1).

5. A fastening member as claimed in claim 2, characterized in that the strap (1), the anchor pin (7) and the clamping member (2) are produced in one piece from a nylon plastics material.

6. A fastening member as claimed in claim 2, characterized in that the insertion end of the strap (1) at a short distance from the anchor pin (7) is provided with laterally projecting protrusions (31).

7. A fastening member as claimed in claim 2, characterized in that in the proximity of the anchor pin (7) the strap (1) has a local cross-section reduction (14) to abate tensile strength.

8. A fastening member as claimed in claim 2, characterized in that the toothed member (6) includes an extension (29) formed as a finger grip projecting outside the clamping member (2).

9. A fastening member as claimed in claim 8, characterized in that the contoured surface (5) is a surface with toothing and the insertion end (4) of the strap over a length is free of said toothing (5) and has a smaller thickness than the remainder of the strap (1).

10. A fastening member as claimed in claim 1, characterized in that the insertion end (4) of the strap over a length is free of said toothing (5) and has a smaller thickness than the remainder of the strap (1).

11. A fastening member as claimed in claim 1, characterized in that the strap (1), the anchor pin (7) and the clamping member (2) are produced in one piece from a plastics material.

12. A fastening member as claimed in claim 11 wherein the plastics material is nylon.

13. A fastening member as claimed in claim 1, characterized in that the insertion end of the strap (1) at a short distance from the anchor pin (7) is provided with laterally projecting protrusions (31).

14. A fastening member as claimed in claim 1, characterized in that in the proximity of the anchor pin (7) the strap (1) has a local cross-section reduction (14) to abate tensile strength.

15. A fastening member as claimed in claim 14, characterized in that said cross-sectional reduction (14) is effected in the first part of the strap (1) which includes the clamping member (2).

16. A fastening member as claimed in claim 1, characterized in that at a distance from the anchor pin with the end of the strap accommodating the clamping member there is connected a stop member for abutment on the side of the cover facing the supporting structure after the transverse anchor pin has been inserted therethrough.

17. A fastening member as claimed in claim 9, characterized in that said stop member is formed by a transverse enlargement of the clamping member.

18. A fastening member as claimed in claim 10, characterized in that the strap (1) at the free end (4) has an opening (15) for carrying a considerable number of fastening members on a carrier.

19. A tool for mounting the fastening member defined in claim 1 in a shielding cover, said tool comprising:
a hollow piston (16) axially displaceable in a holder (19), said piston having a pointed cutting end (17) to perforate the shielding cover and to receive the anchor pin (7) of the strap in a condition in which the strap ends extend to the same side of the anchor pin in abutment against a slide (22) accommodated within the hollow piston (16) and which is not axially displaceable in relation to the holder (19), the hollow piston (16) having in the proximity of its cutting end (17) an external collar (27) to engage the internal surface of the shielding cover and being connected with the holder (19) through a spring-biased release member (20) which by actuation against the bias force releases the holder (19) and the slide (22) for axial displacement along the hollow piston (16) to press out the anchor pin (7) received in the hollow piston (16).

20. A tool as claimed in claim 19 characterized in that the holder (19) is provided with an external hook (28) for insertion through a carrier opening provided in the strap and for tightening up the strap (1) after its free end (4) has been pushed through the clamping member (2).

21. A fastening member as claimed in claim 1, characterized in that the strap (1) includes one or more projecting pins (30) positioned above anchor pin (7) such that said one or more projections contact said intermediate member following the retracting of said strap.

22. A fastening member for fastening a shielding cover to a support structure, comprising:
an anchor pin adapted for insertion through the cover, and a flexible strap having two major surfaces and being connected with the anchor pin, said flexible strap having a first strap part and a second strap part, and said first strap part having a clamping member with a slit or opening formed therein in which a free insertion end of said second strap part can be inserted, said second strap part including a contoured surface and said clamping member having a releasable toothed surface for engaging and fixing the contoured surface of said strap with respect to said clamping member when said insertion end is inserted into the opening in said clamping member, and said anchor pin including two uniform parts positioned on opposite sides of the strap, and said uniform parts being connected with an intermediate member having opposite external and internal lateral surfaces extending essentially at right angles to said major surfaces and firmly connected with said first and second strap parts, and the intermediate member and uniform parts being dimensioned and arranged so as to form an opening for providing for a retracting of the free strap end such that both parts of the strap extend from the external lateral side of the intermediate member.

* * * * *